(12) United States Patent
Takaki (10) Patent No.: US 8,666,412 B2
(45) Date of Patent: Mar. 4, 2014

(54) COMMUNICATIONS TERMINAL, CONNECTION DESTINATION DISPLAY METHOD, AND COMPUTER PROGRAM

(75) Inventor: Tetsuya Takaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/643,217

(22) PCT Filed: Apr. 22, 2011

(86) PCT No.: PCT/JP2011/059942
§ 371 (c)(1),
(2), (4) Date: Oct. 24, 2012

(87) PCT Pub. No.: WO2011/136145
PCT Pub. Date: Nov. 3, 2011

(65) Prior Publication Data
US 2013/0040699 A1  Feb. 14, 2013

(30) Foreign Application Priority Data

Apr. 26, 2010  (JP) .................................. 2010-101407

(51) Int. Cl.
*H04W 4/00* (2009.01)

(52) U.S. Cl.
USPC .................. 455/435.2; 455/435.3; 455/552.1

(58) Field of Classification Search
USPC ............ 455/432.1, 432.2, 432.3, 434, 435.1, 455/435.2, 435.3, 436–344, 552.1; 370/328, 331, 338
See application file for complete search history.

(56) References Cited

U.S. PATENT DOCUMENTS 5,983,115 A * 11/1999 Mizikovsky .................. 455/512
7,120,129 B2 * 10/2006 Ayyagari et al. ............... 370/255
8,116,287 B2 * 2/2012 Krantz et al. .................. 370/338
2002/0087674 A1 * 7/2002 Guilford et al. ............... 709/223
2005/0193150 A1 * 9/2005 Buckley et al. ............... 709/250
2009/0143067 A1 * 6/2009 Kim et al. ...................... 455/434
2010/0022241 A1   1/2010 Hokao

FOREIGN PATENT DOCUMENTS

| JP | 2000-83284 A | 3/2000 | |
| JP | 2001-197545 A | 7/2001 | |
| JP | 2002044729 A * | 2/2002 | .............. H04Q 7/38 |
| JP | 2003-169375 A | 6/2003 | |
| JP | 2004-304399 A | 10/2004 | |
| JP | 2005-348374 A | 12/2005 | |
| JP | 2008-61015 A | 3/2008 | |
| JP | 2008-271560 A | 11/2008 | |
| JP | 2009-246843 A | 10/2009 | |
| WO | 2008/013291 A1 | 1/2008 | |

OTHER PUBLICATIONS

International Search Report for PCT/JP2011/059942 dated Aug. 2, 2011.

* cited by examiner

*Primary Examiner* — San Htun
*Assistant Examiner* — Magdi Elhag
(74) *Attorney, Agent, or Firm* — Sughrue Mion, PLLC (57) ABSTRACT

In a communications terminal, a wireless portion receives, from each PLMN, notification information including a name that specifies the PLMN and communication speed information that indicates communication speed for that PLMN. A generation portion generates a list of names included in each of the notification information received by the wireless portion, in order of communication speed shown in the communication speed information associated with the relevant name. A display portion displays the list generated by the generation portion.

4 Claims, 6 Drawing Sheets

| PLMN | COMMUNICATION FEES (YEN/PACKET) | COMMUNICATION FEE POINTS |
|---|---|---|
| NETWORK A | 0.02 | 4 |
| NETWORK B | 0.1 | 2 |
| NETWORK C | 0.05 | 3 |
| NETWORK D | 0 | 5 |
| NETWORK E | 0.3 | 1 |

COMMUNICATIONS TERMINAL, CONNECTION DESTINATION DISPLAY METHOD, AND COMPUTER PROGRAM

TECHNICAL FIELD

The present invention relates to a communications terminal that can be connected to a plurality of wireless networks, a connection destination display method, and a computer program.

Priority is claimed on Japanese Patent Application No. 2010-101407, filed Apr. 26, 2010, the contents of which are incorporated herein by reference.

BACKGROUND ART

Recently, data communication between communications terminals such as mobile phones is such that correspondence with increased speeds is advancing due to data communication services using an HSDPA (High Speed Downlink Packet Access)/HSUPA (High Speed Uplink Packet Access) communication method, data communication services using an LTE communication method corresponding to high-speed communication, and the like. By developing services using various high-speed data communication methods in this way, it is expected that user convenience will be improved.

However, when a communications terminal corresponds to various high-speed data communication methods, in order to use a more convenient high-speed data communication, a user selects an optimum communication method from among the plurality of high-speed data communication methods.

As a technique used for such a selection operation, Patent Document 1, Patent Document 2, and Patent Document 3 disclose techniques in which a communications terminal automatically selects a communication method having the highest priority such as communication speed, usage fee, or the like.

Moreover, Patent Document 4 discloses a technique in which a communications terminal extracts a communication method that satisfies a condition specified by a user.

Furthermore, Patent Document 5 discloses a technique in which a communications terminal displays connectable communication methods and transmission rates thereof, and notifies the communication method determined to be most appropriate.

[Patent Document 1] Japanese Unexamined Patent Application, First Publication No. 2003-169375
[Patent Document 2] Japanese Unexamined Patent Application, First Publication No. 2004-304399
[Patent Document 3] Japanese Unexamined Patent Application, First Publication No. 2008-271560
[Patent Document 4] Japanese Unexamined Patent Application, First Publication No. 2005-348374
[Patent Document 5] Japanese Unexamined Patent Application, First Publication No. 2008-061015

DISCLOSURE OF INVENTION

However, when the methods disclosed in Patent Documents 1 to 3 are used, the communication method automatically selected by the communications terminal may not match with a communication method desired by a user.

Moreover, when the method disclosed in Patent Document 4 is used, the communications terminal extracts only a communication method that satisfies a condition specified by a user. The user determines by himself/herself which of the extracted communication methods is most appropriate.

Furthermore, when the method disclosed in Patent Document 5 is used, the communication method determined to be most appropriate by the communications terminal may not match with a communication method desired by a user. In this case, the user searches for a desired communication method from the displayed communication methods by himself/herself.

The present invention has, for example, the aspects described below. However, the description below does not limit the present invention.

A first aspect is a communications terminal connectable to a plurality of wireless networks, wherein the communications terminal comprises: a reception portion that receives from each of the wireless networks, notification information including identification information that specifies each of the wireless networks and communication speed information that indicates communication speed for that wireless network; a generation portion that generates a list in which the identification information included in each of the notification information received by the reception portion is arranged in order of communication speed shown in the communication speed information associated with the identification information; and a display portion that displays the list generated by the generation portion.

A second aspect is a connection destination display method that uses a communications terminal connectable to a plurality of wireless networks, wherein: a reception portion receives from each of the wireless networks, notification information including identification information that specifies each of the wireless networks and communication speed information that indicates communication speed for that wireless network; a generation portion generates a list in which the identification information included in each notification information received by the reception portion is arranged in order of communication speed shown in the communication speed information associated with the identification information; and a display portion displays the list generated by the generation portion.

A third aspect is a computer program for causing a communications terminal connectable to a plurality of wireless networks to function as: a reception portion that receives from each of the wireless networks, notification information including identification information that specifies each of the wireless networks and communication speed information that indicates communication speed for that wireless network; a generation portion that generates a list in which the identification information included in each notification information received by the reception portion is arranged in order of communication speed shown in the communication speed information associated with the identification information; and a display portion that displays the list generated by the generation portion.

EFFECTS OF THE INVENTION

According to the above-described aspects, for example, there are the following effects. That is to say, the communications terminal displays identification information that specifies a wireless network indicated in the received notification information in order of communication speed of the wireless network. Accordingly, a user can easily find a network having the fastest communication speed. Moreover, even if the network having the fastest communication speed is not a desired network for the user, the user can search for a network in order of communication speed, thereby enabling to search for a desired network easily.

BEST MODE FOR CARRYING OUT THE INVENTION

First Embodiment

Hereunder, a first embodiment is described in detail, with reference to the drawings.

Figure 1:
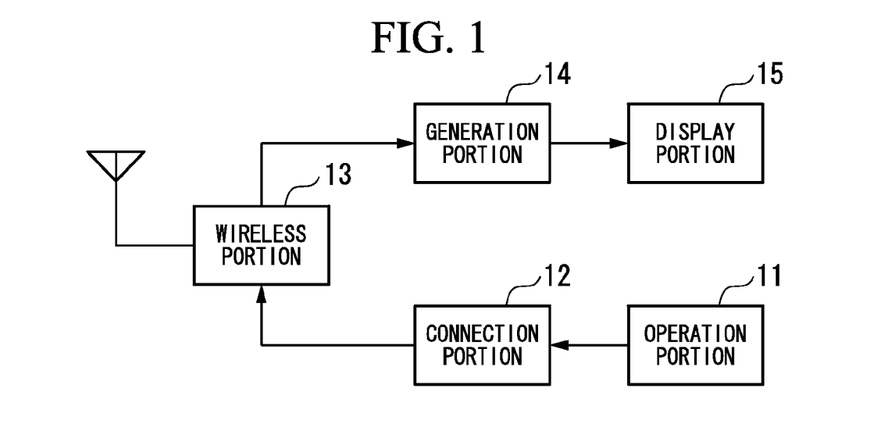
FIG. 1 is a schematic block diagram showing a configuration of a communications terminal according to a first embodiment.

FIG. 1 is a schematic block diagram showing a configuration of a communications terminal according to the first embodiment.

The communications terminal includes; an operation portion 11 (selection portion), a connection portion 12, a wireless portion 13 (reception portion), a generation portion 14, and a display portion 15.

The operation portion 11 has a key button (not shown), and receives from a user by operation of the key button, a PLMN (Public Land Mobile Network, wireless network) search start command and a wireless network selection command, and outputs a command to the connection portion 12.

Upon input of the search start command from the operation portion 11, the connection portion 12 executes a PLMN search via the wireless portion 13. Moreover, upon input of a PLMN selection command from the operation portion 11, the connection portion 12 connects to a PLMN indicated by the PLMN selection command via the wireless portion 13.

The wireless portion 13 converts a signal input from the connection portion 12, to a wireless signal to communicate with the PLMN. Moreover, the wireless portion 13 outputs the PLMN search result information to the generation portion 14.

The generation portion 14 uses the PLMN search result information input from the wireless portion 13 to generate a connectable PLMN list.

The display portion 15 displays the list generated by the generation portion 14 on a screen.

Then, because the communications terminal has the above-described configuration, the wireless portion 13 receives from each PLMN, notification information including a name that specifies a PLMN, and communication speed information that indicates communication speed for that PLMN. Subsequently, the generation portion 14 generates a list in which the names included in the notification information received by the wireless portion 13 are arranged in order of communication speed indicated by the communication speed information associated with the names. The display portion 15 displays the list generated by the generation portion 14.

As a result, a user can easily find a PLMN having the fastest communication speed, and can easily find a desired PLMN even if the network having the fastest communication speed is not a PLMN desired by the user.

Next is a description of an operation of the communications terminal according to the first embodiment.

Figure 2:
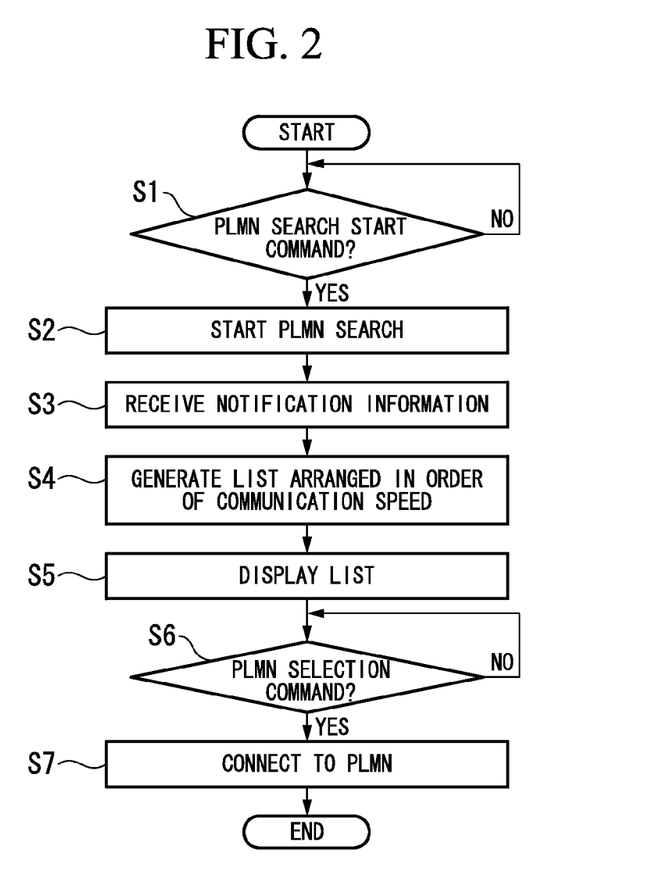
FIG. 2 is a flowchart showing an operation of the communications terminal according to a second embodiment.

FIG. 2 is a flowchart showing an operation of the communications terminal according to the first embodiment.

At first, the operation portion 11 of the communications terminal determines whether there is a PLMN search start command from a user (Step S1). When determined that there is no input of a PLMN search start command from the user (Step S1: NO), the process is repeatedly executed until an input of a PLMN search start command is received from the user.

When the user presses a "PLMN search start" button displayed on the display portion by operating the key button of the operation portion 11, the operation portion 11 receives an input of a PLMN search start command from the user. When the operation portion 11 determines that the PLMN search start command has been input from the user (Step S1: YES), the connection portion 12, upon input of the PLMN search start command from the operation portion 11, starts a PLMN search via the wireless portion 13 (Step S2).

Upon starting execution of the PLMN search, the wireless portion 13 receives the notification information by means of a frequency set to a PLMN connectable to the own terminal (Step S3). Here the notification information is information generated by each base station device of the PLMN at a predetermined time interval, and information indicating an operation parameter of the PLMN including the name of the PLMN, the type of the PLMN, communication speed, and the like.

Figure 3:
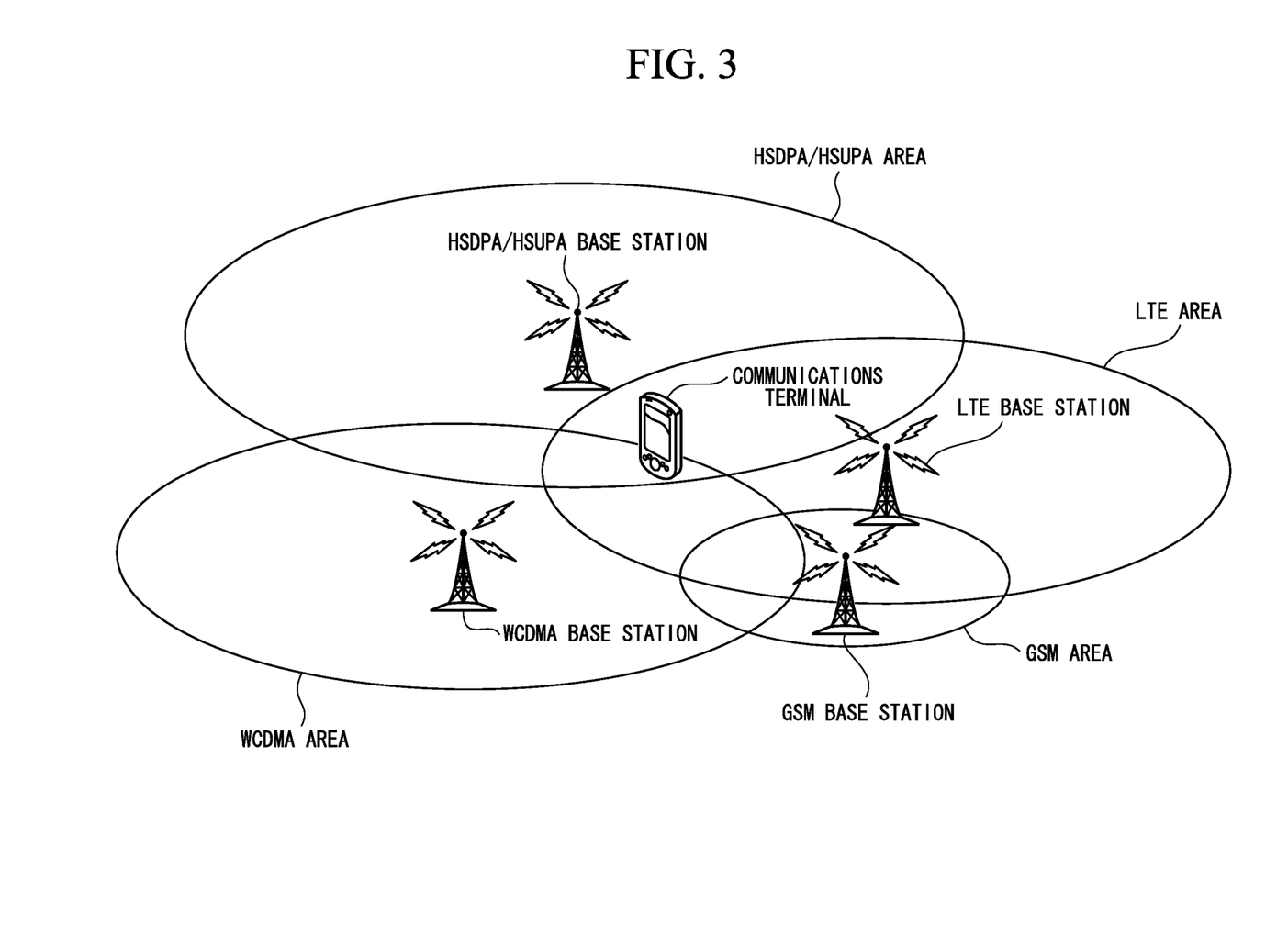
FIG. 3 is a diagram showing an example of the positional relationship between a communications terminal and PLMN communication areas.

FIG. 3 shows an example of the positional relationship between the communications terminal and PLMN communication areas.

In the example shown in FIG. 3, a WCDMA area being a communication range of a WCDMA base station, an HSDPA/HSUPA area being a communication range of an HSDPA/HSUPA base station, an LTE area being a communication range of an LTE base station, and a GSM area being a communication range of a GSM base station are mixed together. Moreover, the communications terminal exists at a position where the WCDMA area, the HSDPA/HSUPA area, and the LTE area are mixed.

When a communications terminal exists at the position shown in FIG. 3, the wireless portion 13 of the communications terminal receives notification information respectively from the WCDMA base station, the HSDPA/HSUPA base station, and the LTE base station.

Upon finishing reception of the notification information by all set frequencies, the wireless portion 13 outputs the received notification information to the generation portion 14. The generation portion 14 generates a list in which names and types of the PLMNs included in the notification information input from the wireless portion 13 are arranged in order of communication speed (Step S4). Upon generating the list, the generation portion 14 outputs the list to the display portion 15.

Upon input of the list from the generation portion 14, the display portion 15 displays a screen for causing the user to select to which PLMN included in the list the communications terminal should be connected (Step S5).

Figure 4:
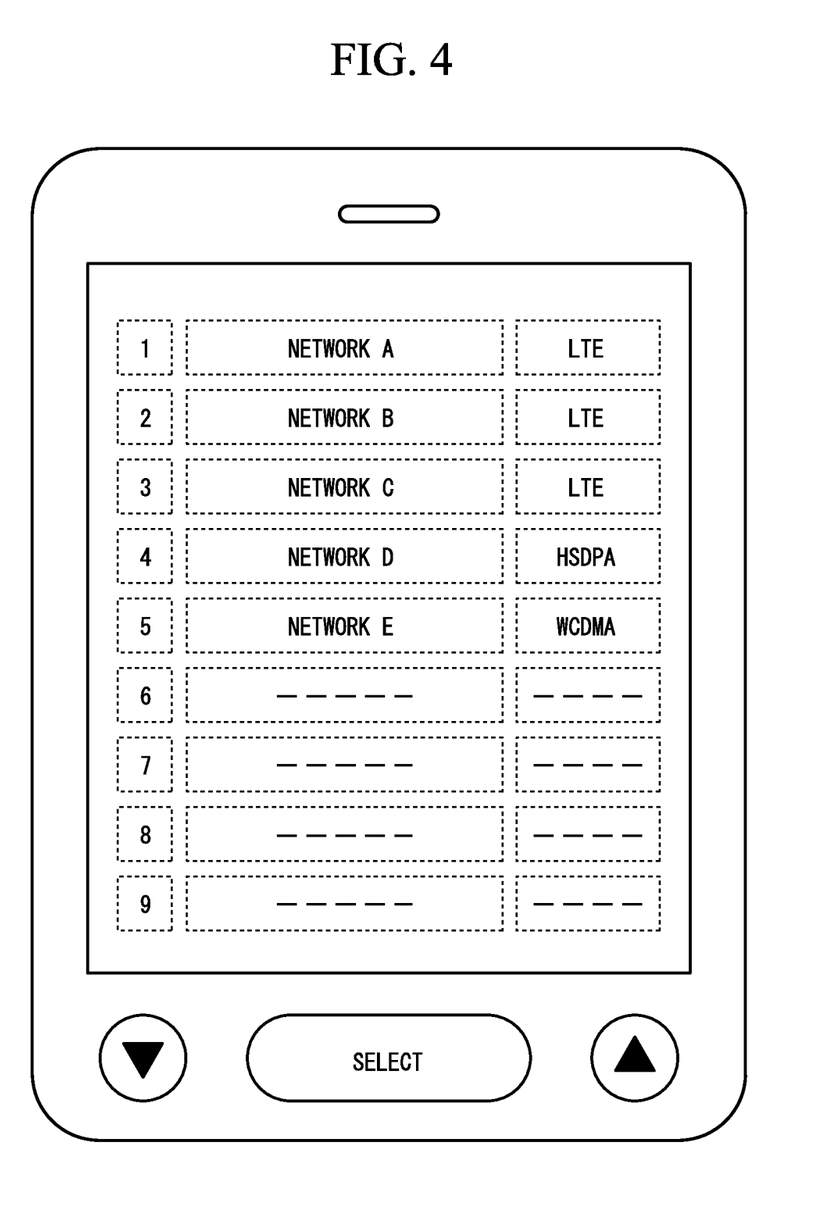
FIG. 4 shows a screen example of the communications terminal according to the first embodiment.

FIG. 4 shows a screen example of the communications terminal according to the first embodiment.

When a communications terminal exists at the position shown in FIG. 3 and the wireless portion 13 of the communications terminal receives the notification information respectively from the WCDMA base station, the HSDPA/HSUPA base station, and the LTE base station, the display portion 15 displays the information shown in FIG. 4 on the screen. In the example shown in FIG. 3, the communication speed of the LTE is 100 Mbps, the communication speed of the HSDPA/HSUPA is 15 Mbps, the communication speed of the WCDMA is 400 kbps, and the communication speed of the GSM is 9.6 kbps.

Subsequently, the operation portion 11 determines whether there is a PLMN selection command from the user (Step S6). When the operation portion 11 determines that there is no input of the PLMN selection command from the user (Step S6: NO), the process is repeatedly executed until an input of a PLMN selection command is received from the user.

The user selects a desired PLMN from the list displayed on the display portion by operating the key button of the operation portion 11, and presses a "select" button displayed on the display portion so that the operation portion 11 receives an input of the PLMN selection command from the user. When the operation portion 11 determines that the user has input the PLMN selection command (Step S6: YES), the connection portion 12, upon input of the PLMN selection command from the operation portion 11, starts connection to the PLMN indicated by the PLMN selection command via the wireless portion 13 (Step S7).

In this manner, when the user inputs the PLMN search command, the communications terminal according to the present embodiment executes a PLMN search with respect to peripheral networks, and displays PLMNs in order of communication speed included in the detected notification information of the PLMNs. Accordingly, because the communications terminal displays the detected PLMNs in descending order of communication speed, the user can connect the communications terminal to a PLMN having the fastest communication speed by always selecting a network displayed at the top of the displayed PLMNs. Moreover, also when the PLMN having the fastest communication speed is different from a PLMN desired by the user, since the connectable PLMNs can be browsed in order of communication speed, the desired network can be easily searched.

Second Embodiment

Hereunder, a second embodiment is described in detail, with reference to the drawings.

Figure 5:
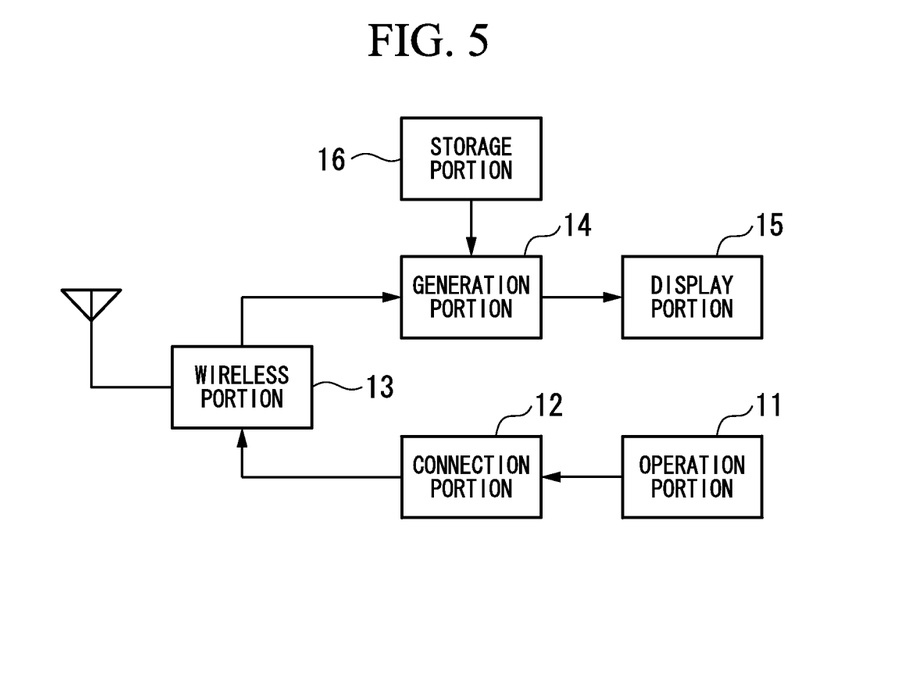
FIG. 5 is a schematic block diagram showing a configuration of a communications terminal according to a second embodiment.

FIG. 5 is a schematic block diagram showing a configuration of a communications terminal according to the second embodiment.

The communications terminal according to the second embodiment further includes a storage portion 16 added to the communications terminal according to the first embodiment. Moreover, operation of the generation portion 14 is different compared to the first embodiment.

The storage portion 16 stores, in association with the name of the connectable PLMN, communication fees involved with communication using the PLMN and communication fee points indicating the expensiveness of the communication fees.

The generation portion 14 receives the input of the PLMN search result information from the wireless portion 13, and generates a list of connectable PLMNs by using the PLMN search result information and information stored in the storage portion 16.

Figure 6:
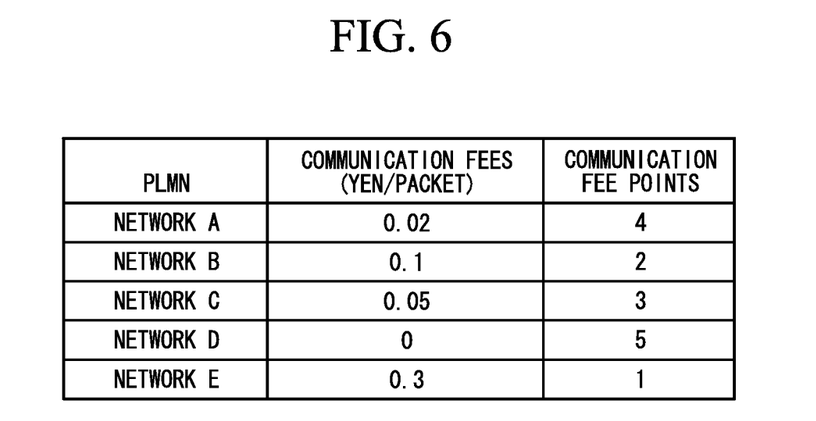
FIG. 6 shows an example of information stored in a storage portion.

FIG. 6 shows an example of information stored in the storage portion.

As shown in FIG. 6, the storage portion 16 stores the names of PLMNs, communication fees, and communication fee points in association with each other.

Here the communication fee points are values indicating in multiple stages the expensiveness of communication fees. In the example shown in FIG. 6, the communication fee point indicates the expensiveness of communication fees in 5 stages from "1" to "5". Moreover, it indicates that the communication fee becomes lower as the communication fee points become higher.

In the example shown in FIG. 6, when the communication fee per one packet is 0 yen, the communication fee point is "5". When the communication fee per one packet exceeds 0 yen and is equal to or less than 0.03 yen, the communication fee point is "4". When the communication fee per one packet exceeds 0.03 yen and is equal to or less than 0.06 yen, the communication fee point is "3". When the communication fee per one packet exceeds 0.06 yen and is equal to or less than 0.1 yen, the communication fee point is "2". When the communication fee per one packet exceeds 0.1 yen, the communication fee point is "1".

Next is a description of an operation of the communications terminal according to the second embodiment.

Figure 7:
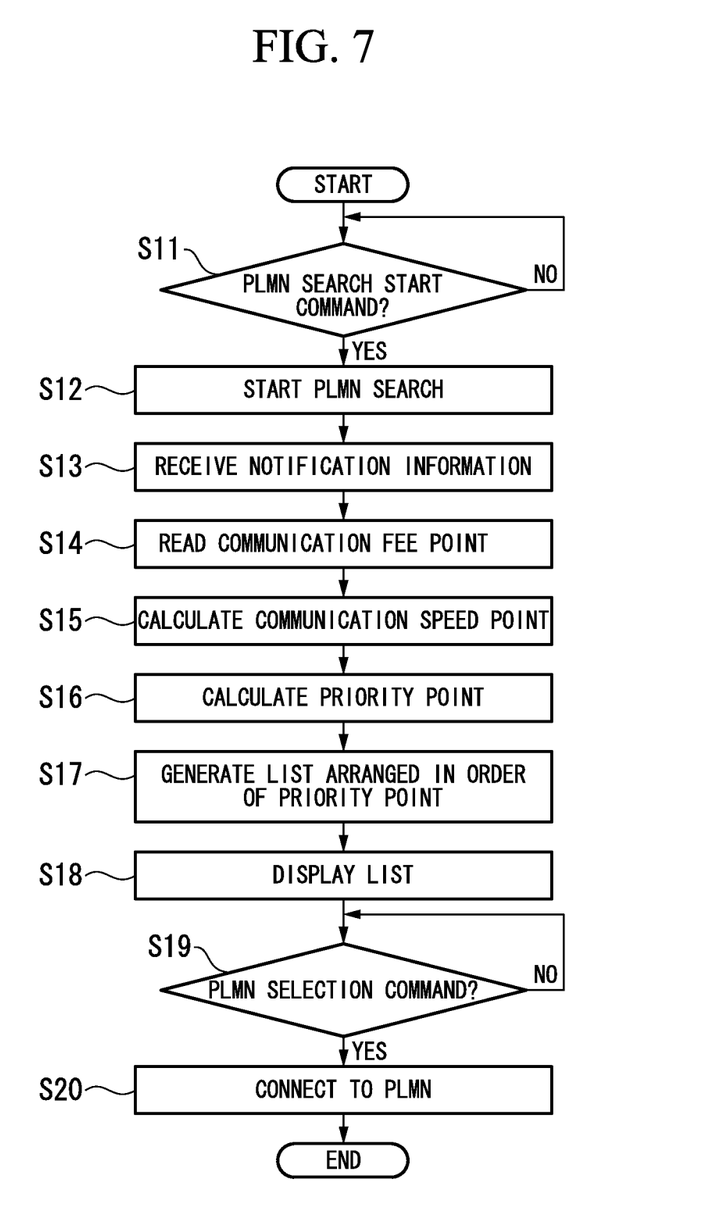
FIG. 7 is a flowchart showing an operation of the communications terminal according to the second embodiment.

FIG. 7 is a flowchart showing an operation of the communications terminal according to the second embodiment.

At first, the operation portion 11 of the communications terminal determines whether there is a PLMN search start command from a user (Step S11). When determined that there is no input of the PLMN search start command from the user (Step S11: NO), the process is repeatedly executed until an input of a PLMN search start command is received from the user.

When the user presses a "PLMN search start" button displayed on the display portion by operating the key button of the operation portion 11, the operation portion 11 receives an input of a PLMN search start command from the user. When the operation portion 11 determines that the PLMN search start command has been input from the user (Step S11: YES), the connection portion 12, upon input of the PLMN search start command from the operation portion 11, starts a PLMN search via the wireless portion 13 (Step S12).

Upon starting execution of the PLMN search, the wireless portion 13 receives the notification information by means of a frequency set to a PLMN connectable to the own terminal (Step S13).

Upon finishing reception of the notification information by all set frequencies, the wireless portion 13 outputs the received notification information to the generation portion 14.

Subsequently, the generation portion 14 reads, from the storage portion 16, the communication fee point associated with the name of the PLMN included in each notification information input from the wireless portion 13 (Step S14).

Moreover, the generation portion 14 calculates a communication speed point based on the communication speed included in each notification information input from the wireless portion 13 (Step S15). Here the communication speed points are values indicating in multiple stages the quickness of communication speed. In the present embodiment, the communication speed point indicates the quickness of communication speed in 5 stages from "1" to "5". Furthermore, it indicates that the communication speed becomes faster as the communication speed points become higher.

In the present embodiment, when the communication speed is equal to or higher than 100 Mbps, the communication speed point is "5". When the communication speed is equal to or higher than 10 Mbps and less than 100 Mbps, the communication speed point is "4". When the communication speed is equal to or higher than 1 Mbps and less than 10 Mbps, the communication speed point is "3". When the communication speed is equal to or higher than 0.1 Mbps and less than 1 Mbps, the communication speed point is "2". When the communication speed is less than 0.1 Mbps, the communication speed point is "1".

As a result, when the communication speed of the LTE is 100 Mbps, the communication speed of the HSDPA/HSUPA is 15 Mbps, the communication speed of the WCDMA is 400 kbps, and the communication speed of the GSM is 9.6 kbps, the generation portion 14 calculates such that the communication speed point of the LTE is "5", the communication speed point of the HSDPA/HSUPA is "4", the communication speed point of the WCDMA is "2", and the communication speed point of the GSM is "1".

When calculating the communication speed point in Step S15, the generation portion 14 adds the communication fee point read in Step S14 and the communication speed point calculated in Step S15, to calculate a priority point of each PLMN of the sender of the notification information received by the wireless portion 13 (Step S16). The priority point is a point indicating an order of priority at the time of notifying the user of the PLMN information. That is, the generation portion 14 adds the communication fee point associated with the name of a PLMN included in certain notification information and the communication speed point calculated from the communication speed included in the notification information, to calculate the priority point of the PLMN of the sender of the notification information.

Subsequently, the generation portion 14 generates a list in which names, types, and communication fees of PLMNs included in the notification information input from the wireless portion 13 are arranged in order of priority points (Step S17). Upon generating the list, the generation portion 14 outputs the list to the display portion 15.

Upon input of the list from the generation portion 14, the display portion 15 displays a screen for causing the user to select to which PLMN included in the list the communications terminal should be connected (Step S18).

Figure 8:
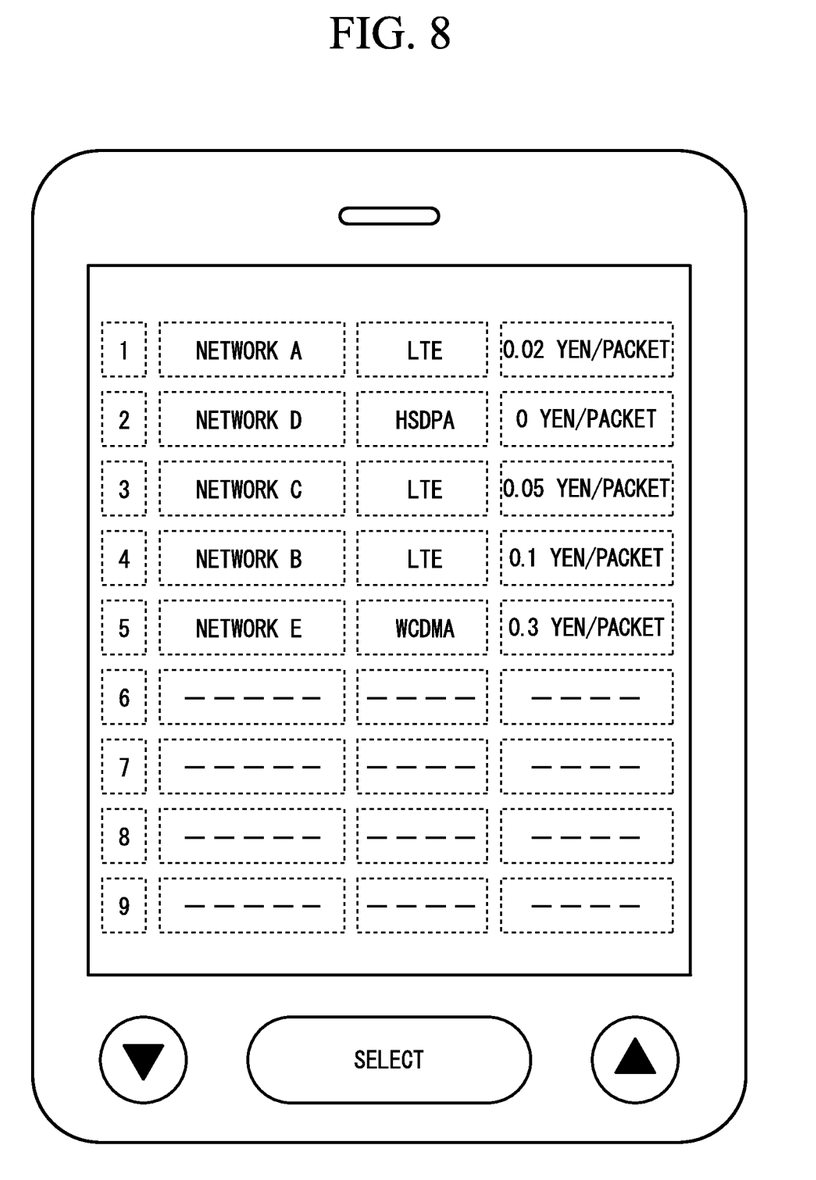
FIG. 8 shows a screen example of the communications terminal according to the second embodiment.

FIG. 8 shows a screen example of the communications terminal according to the second embodiment.

When a communications terminal exists at a position shown in FIG. 3, and the wireless portion 13 of the communications terminal receives the notification information respectively from the WCDMA base station, the HSDPA/HSUPA base station, and the LTE base station, the display portion 15 displays the information shown in FIG. 8 on the screen.

In this manner, in the second embodiment, a network having fast communication speed and low communication fees is displayed at the top, different from the first embodiment.

Subsequently, the operation portion 11 determines whether there is a PLMN selection command from the user (Step S19). When the operation portion 11 determines that there is no input of the PLMN selection command from the user (Step S19: NO), the process is repeatedly executed until an input of a PLMN selection command is received from the user.

The user selects a desired PLMN from the list displayed on the display portion by operating the key button of the operation portion 11, and presses a "select" button displayed on the display portion so that the operation portion 11 receives an input of the PLMN selection command from the user. When the operation portion 11 determines that the user has input the PLMN selection command (Step S19: YES), the connection portion 12, upon input of the PLMN selection command from the operation portion 11, starts connection to the PLMN indicated by the PLMN selection command via the wireless portion 13 (Step S20).

In this manner, when the user inputs the PLMN search command, the communications terminal according to the present embodiment executes a PLMN search with respect to peripheral networks, and displays PLMNs having fast communication speed and low communication fees of the detected PLMNs in ascending order. As a result, the user can connect the communications terminal to a PLMN having fast communication speed and low communication fees by always selecting a network displayed at the top of the displayed PLMNs. Moreover, also when the PLMN displayed at the top is different from a PLMN desired by the user, since the connectable PLMNs can be browsed in order of fast communication speed and low communication fees, the desired network can be easily searched.

The embodiments have been explained above in detail with reference to the drawings. However, the specific configuration is not limited thereto, and design changes can be made without departing from the scope of the present invention.

For example, in the second embodiment, a case has been described in which the range of the communication fee points and the communication speed points is from "1" to "5", and the value obtained by adding the communication fee points and the communication speed points is set as the priority point. However, the present invention is not limited thereto. For example, a user can input beforehand weighting information of a degree of importance with respect to the communication fees and communication speed, and the priority point can be calculated by using a weighting coefficient calculated based on the weighting information. Specifically, when the operation portion 11 inputs information from a user indicating that a ratio of the degree of importance with respect to the communication fee and the communication speed is "7:3", the generation portion 14 calculates a communication fees weighting point as "7" and a communication speed weighting point as "3". Then the generation portion 14 multiplies the calculated communication fee point by the communication fee weighting point of "7", and multiplies the calculated communication speed point by the communication speed weighting point of "3", and sets a value obtained by adding the respectively weighted communication fee point and communication speed point as the priority point.

As a result, the probability of a PLMN desired by the user being displayed at the top can be increased.

Moreover, in the second embodiment, an example has been described in which the communication fee point and the communication speed point are obtained by dispersing the communication fees and the communication speed within a predetermined threshold. However, the present invention is not limited thereto, and for example, an order of expensiveness of the communication fees or an order of slowness of the communication speed can be used directly as a point.

Furthermore, in the second embodiment, a case has been described in which the storage portion 16 stores the communication fee points beforehand. However, the present invention is not limited thereto, and the configuration may be such that the storage portion 16 can store only the communication fees, and the generation portion 14 can calculate the communication fee points based on the above-described condition.

The communications terminal includes a computer system therein. Operations of the respective processing portions are stored on a computer readable recording medium in a program format. The program is read and executed by the computer to execute the above-described processing. Here the computer readable recording medium can be a magnetic disk, a magneto-optical disc, a CD-ROM, a DVD-ROM, a semiconductor memory, or the like. Moreover, the computer program can be distributed to computers through a communication line, and computers having received the delivery can execute the program.

Moreover, the program can be for realizing a part of the above-described functions.

Furthermore, the functions can be realized by a combination with a program already recorded in the computer system, and can be a so-called differential file (differential program).

INDUSTRIAL APPLICABILITY

The present invention can be applied to, for example, a communications terminal connectable to a plurality of wireless networks.

DESCRIPTION OF THE REFERENCE NUMERALS 11 operation portion
12 connection portion
13 wireless portion
14 generation portion
15 display portion
16 storage portion

The invention claimed is:

1. A communications terminal connectable to a plurality of wireless networks, comprising:
 a reception portion receiving, from each of the wireless networks, notification information including both identification information that specifies each of the wireless networks and communication speed information that indicates communication speed for the wireless network;
 a generation portion generating a list in which the identification information included in the notification information is arranged in order of the communication speed shown in the communication speed information associated with the identification information;
 a storage portion storing communication fee points indicating in multiple stages a level of communication fees involved with communication using the wireless network, in association with the identification information of the wireless network;
 a communication speed point calculation portion that calculates communication speed points indicating in multiple stages a level of the communication speed, based on a communication speed shown by communication speed information included in the notification information; and
 a display portion displaying the list, wherein
 the generation portion generates a list in which the identification information included in notification information received by the reception portion is arranged in order of values obtained by adding communication speed points calculated by the communication speed point calculation portion based on communication speed information associated with the identification information and communication fee points stored in the storage portion in association with the identification information.

2. A communications terminal according to claim 1, comprising:
 a selection portion receiving a command indicating the wireless network which is selected while displaying the list on the display portion and outputting the identification information corresponding to the selected wireless network; and
 a connection portion connecting to the wireless network corresponding to the identification information input from the selection portion.

3. A connection destination display method that uses a communications terminal connectable to a plurality of wireless networks, comprising:
 a step of receiving from each of the wireless networks, notification information including both identification information that specifies the wireless network and communication speed information that indicates communication speed for the wireless network;
 calculating communication speed points indicating in multiple stages a level of the communication speed, based on a communication speed shown by communication speed information included in the notification information;
 a step of generating a list in which identification information included in the notification information is arranged in order of the communication speed shown in the communication speed information associated with the identification information, wherein the identification information included in the notification information is arranged in order of values obtained by adding communication speed points associated with the identification information and communication fee points stored in a storage portion in association with the identification information, and wherein the communication fee points stored in the storage portion indicate in multiple stages a level of communication fees involved with communication using the wireless network, in association with the identification information of the wireless network; and
 a step of displaying the list.

4. A computer program stored in a computer readable non-transitory recording medium of a communications terminal connectable to a plurality of wireless networks, comprising:
 a command for receiving from each of the wireless networks, notification information including both identification information that specifies the wireless network and communication speed information that indicates communication speed for the wireless network;
 a command for calculating communication speed points indicating in multiple stages a level of the communication speed, based on a communication speed shown by communication speed information included in the notification information;
 a command for generating a list in which identification information included in the notification information is arranged in order of the communication speed shown in the communication speed information associated with the identification information, wherein the identification information included in the notification information is arranged in order of values obtained by adding communication speed points associated with the identification information and communication fee points stored in a storage portion in association with the identification information, and wherein the communication fee points stored in the storage portion indicate in multiple stages a level of communication fees involved with communication using the wireless network, in association with the identification information of the wireless network; and
 a command for displaying the list.

* * * * *